INVENTOR.
FRANK P. PENDLETON
BY
ATTORNEY

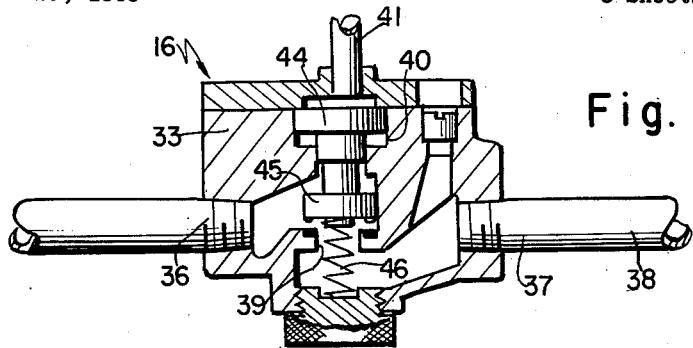
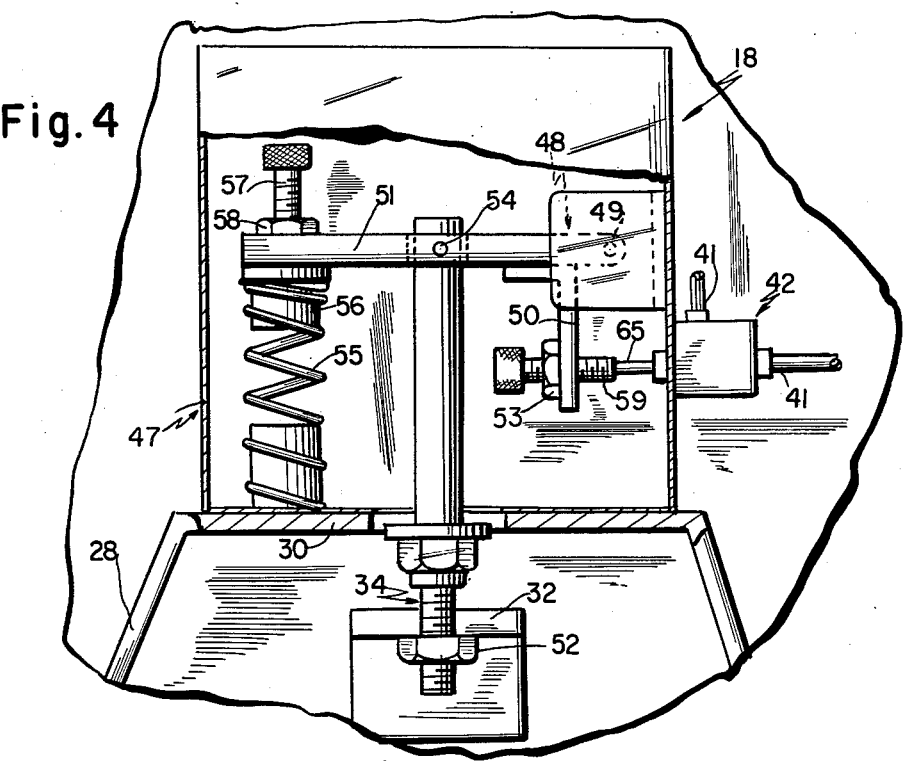
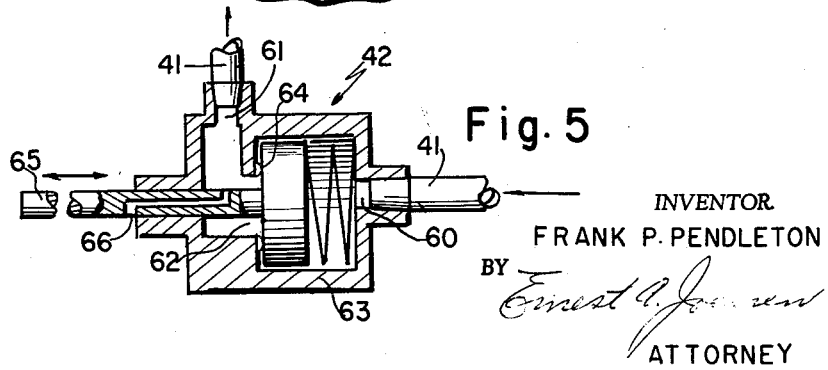

June 1, 1965 F. P. PENDELTON 3,186,768
PNEUMATICALLY OPERATED APPARATUS FOR FEEDING FLUENT MATERIAL
Filed March 29, 1963 3 Sheets-Sheet 3

INVENTOR.
FRANK P. PENDLETON
BY
ATTORNEY

United States Patent Office 3,186,768
Patented June 1, 1965

3,186,768
PNEUMATICALLY OPERATED APPARATUS FOR FEEDING FLUENT MATERIAL
Frank P. Pendleton, Montclair, N.J., assignor to Vac-U-Max, Belleville, N.J., a corporation of New Jersey
Filed Mar. 29, 1963, Ser. No. 268,892
10 Claims. (Cl. 302—3)

The present invention relates to pneumatically operated apparatus for feeding fluent material, and, more particularly, to improved apparatus of this type wherein a given weight of material is induced by vacuum to flow into a vessel and then is discharged therefrom to equipment for further handling of the material.

Heretofore, as illustrated in my prior U.S. Patent 2,992,858, it has been proposed to volumetrically measure batches of fluent material in a vessel such as a hopper and then discharging the material from the hopper for delivery to a point of further use.

While such apparatus is completely satisfactory for performing its intended operations under given conditions of use and for particular materials, the volumetric measuring of fluent material by such apparatus is difficult to adjust to measure and deliver batches of equal or almost equal weight where the apparatus from time to time (1) must handle materials varying widely in apparent density or (2) the apparent density of a given material is subject to change due to variations to the effects of moisture, manufacturing procedures, temperature, or other causes.

In the first instance, the level to which the hopper should be filled to provide a batch of a given weight of material must be predetermined with reference to the apparent weight of the particular material and such level may vary over such a wide range for which level sensing or indicating means are incapable of adjustment. In the second instance when handling materials subject to variation in apparent density, such variations must first be detected before adjustment can be made and thus may not be detected immediately unless vigilant control tests are made of the incoming material. In both instances, the adjustment of the level to which the hopper should be filled is undesirable because each change of apparent density introduces an opportunity for human error or inaccuracy.

Accordingly, an object of the present invention is to provide improved apparatus for measuring and supplying batches of fluent material which is not subject to the foregoing difficulties and disadvantages.

Another object is to provide such apparatus which, in one form thereof, can be operated to replenish a feed hopper of equipment for processing the material at the demand rate for the material by the equipment.

Another object is to provide such apparatus which, in another form thereof, can be operated to measure and supply batches of equal weight which weight can be accurately predetermined and varied over a wide range.

Another object is to provide such apparatus which particularly lends itself to pneumatically operated control means responsive to a given weight of material in the batch measuring hopper, although electrically operated control means may be utilized instead in cases where the presence of electrical wiring and switches involves no hazard.

A further object is to accomplish the foregoing in a simple, practical, reliable and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects generally are accomplished by providing apparatus comprising in combination a vessel for receiving and storing fluent material having an inlet adjacent the upper end thereof for connection to a source of fluent material, an outlet at the lower end thereof for discharging the material therefrom and an opening above the inlet; a vacuum pump having an air intake connected to the opening for creating a vacuum in the vessel and having means for energizing the same; switch means for controlling the pump energizing means; means for pivotally mounting the vessel to assume different positions depending on the weight of fluent material therein; control means adjacent and operable by the vessel in response to the position of the vessel for controlling the switch means; and a valve for the discharge outlet of the vessel constructed and arranged to be closed when the interior of the vessel is under vacuum and to be opened when the interior of the vessel is under atmospheric pressure.

In the drawings:

FIG. 3 is an enlarged longitudinal section view of a valve for controlling the flow of the gaseous pressure medium to the jet pump which is under the control of a pilot valve shown in FIG. 5.

FIG. 4 is an enlarged detailed elevational view of a control device for the apparatus shown in FIGS. 1 and 2.

FIG. 5 is an enlarged longitudinal sectional view of a pilot valve embodied in the control device.

Figure 1:
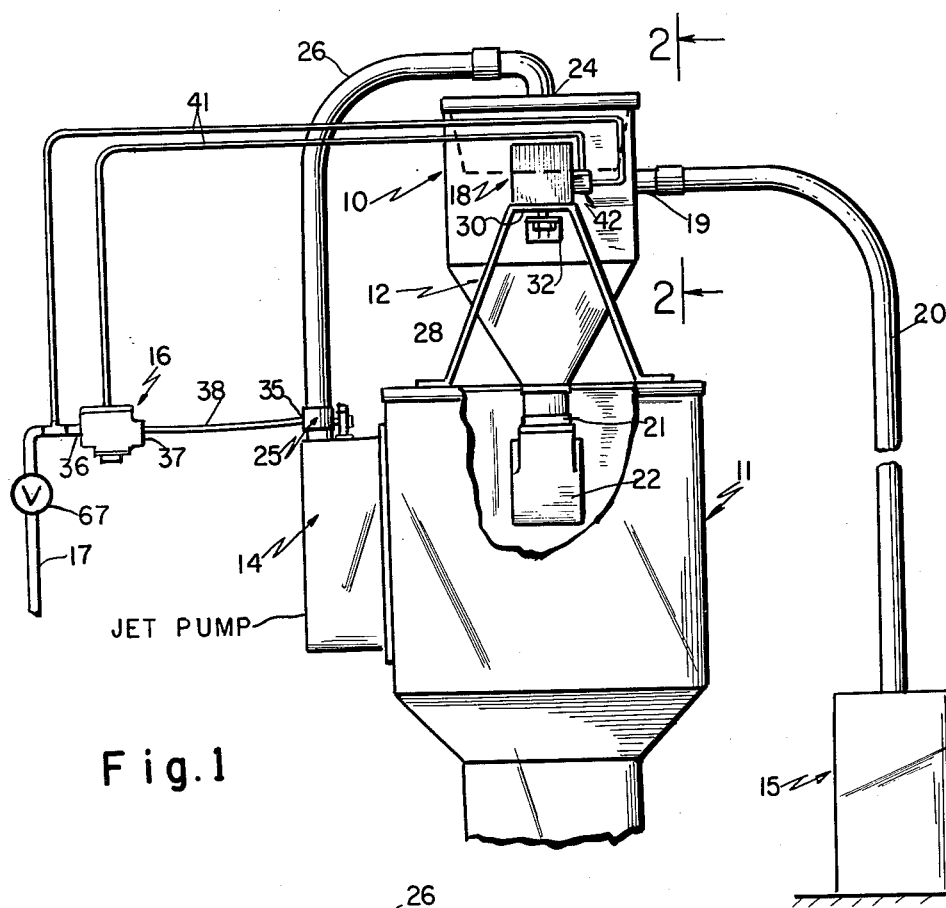
FIG. 1 is a schematic side view of one form of apparatus in accordance with the present invention including the conduits, valving and controls for the apparatus.

Referring now to the drawings in detail and more particularly to FIGS. 1 to 5 thereof, apparatus is shown which generally comprises a vessel such as a hopper 10 for receiving and storing fluent material and delivering the material to a point of use such as a feed hopper 11 for a molding machine (not shown), structure 12 for pivotally supporting the hopper 10 above the hopper 11 to enable the hopper 10 to assume different positions depending on the amount of fluent material therein, a vacuum pump such as a gaseous pressure medium operated jet pump 14 for creating a vacuum in the hopper 10, to withdraw fluent material from a source of supply 15, a switch such as a valve 16 for controlling the flow of gaseous pressure medium such as air at about 60 p.s.i.g. to the jet pump 14 from a supply pipe 17, and a control device 18 for the valve 16 associated with the hopper 10 and its mounting structure 12 and constructed and arranged to respond to the positions of the hopper 10.

Figure 2:
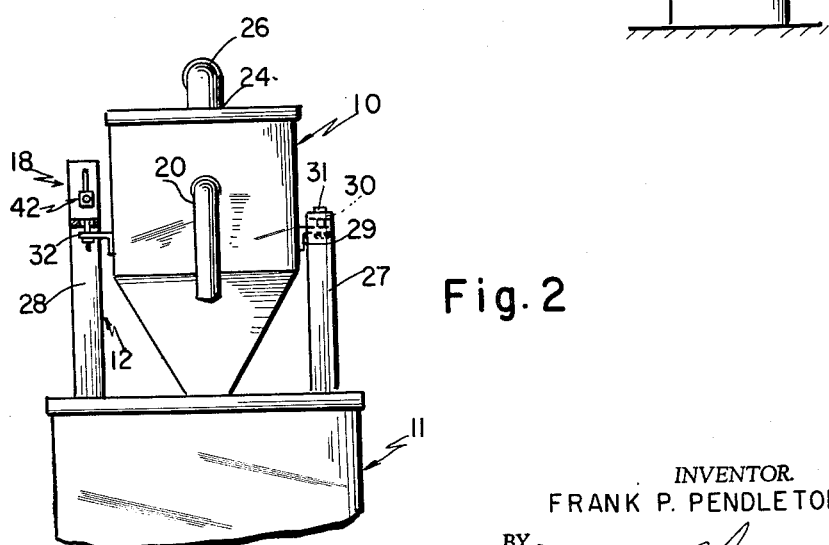
FIG. 2 is a schematic side view taken along the line 2—2 on FIG. 1 with certain of the conduits, valving and controls being omitted.

As shown in FIGS. 1 and 2, the hopper 10 has an inlet 19 adjacent its upper end connected to the fluent material source 15 by a flexible conduit 20, a discharge outlet 21 at its lower end controlled by a valve 22 which may be of the type which responds to close when the hopper is vacuumized and to open when the hopper is under atmospheric pressure, and an opening 24 above the inlet 19 connected to the air intake 25 of the jet pump 14 by a flexible conduit 26.

The mounting and supporting structure 12 for the hopper 10, as shown in FIGS. 1 and 2, comprises brackets 27 and 28 mounted on the hopper 11 at diametrically opposite sides of the hopper 10; a pivotal connection between the hopper 10 and the bracket 27 including a lug 29 on the hopper 10, a horizontal upper plate section 30 on the bracket 27 and a pair of loosely secured bolts 31 extending through aligned apertures in the lug 29 and the plate section 30 to allow the hopper to tilt but to prevent the hopper from turning about its vertical central axis; and linkage between the hopper 10 and the control device 18, which is mounted on top of the bracket 28, including an apertured lug 32 on the hopper 10 for connection to an element 34 of the control device 18 in a manner to cause the control device 18 to respond to tilting movement of the hopper 10 as described hereinafter.

The jet pump 14 has a pressure medium inlet 35 for connection to the air supply pipe 17 through the valve 16. The jet pump 14 is of the type disclosed in the aforementioned patent and thus does need not be described in detail.

The valve 16 shown in FIG. 3 is of the normally open type. This valve comprises a valve body 33 having an inlet 36 for connection to the air pipe 17, an outlet 37 for connection to the jet pump inlet 35 by a pipe 38, a valve port 39 between the inlet 36 and the outlet 37 and a cylinder 40 above the valve port 39 formed with an inlet for connection to the air pipe 17 by a pipe 41 through a pilot valve 42 embodied in the control device 18; a piston 44 slidably mounted in the cylinder 40; a valve member 45 for opening and closing the valve port 39 carried by the piston 44; and a spring 46 for urging the piston and valve member in a direction to maintain the port open.

As shown in FIG. 4, the control device 18 comprises a casing 47 mounted and secured on the bracket 28 and having the pilot valve 42 secured to a side wall thereof; a lever 48 pivotally mounted on the back wall of the casing at 49 and having a vertical arm 50 for operating the pilot valve 42 and having a horizontal arm 51; a link constituting the element 34 on which the lug 32 of the hopper is supported by a nut 52 screwed onto the element 34 at its lower end and being pivotally connected at its upper end to the lever arm 51 at 54; and a spring 55 biased for compression between the free end of the lever arm 51 and the bottom wall of the casing 47.

In order to adjust the control device 18, the upper end of the spring 55 is mounted on a retainer 56 which is adjustably mounted on the lever arm 51 by a bolt 57 threaded through the lever arm 51 and by a locking nut 58 threaded on the bolt 57, whereby the position of the lever 48 can be predetermined when the hopper 10 is empty. Also, a bolt 59 provided with a locking nut 53 is threaded through the lever arm 50 and is positioned for operating the pilot valve 42, whereby the bolt 59 can be adjusted to predetermine the distance the lever 48 must travel in response to loading of the hopper 10 before operation of the pilot valve is effected.

As shown in FIG. 5, the pilot valve 42 is normally closed and is adapted to be opened to effect actuation of the piston 44 to close the valve 16. In order to accomplish this, the pilot valve 42 comprises a valve body 63 having an inlet 60 and an outlet 61, respectively connected in the pipe 41, and a port 62 surrounded by a seat between the inlet 60 and the outlet 61; a slidably mounted valve member 64 normally urged by the pressure of the air in the pipe 41 onto the seat of the port 62 to close the same; a stem 65 movable with the valve member 64 and having a free end extending outwardly of the valve body 63 for engagement and movement by the bolt 59 to unseat the valve member 64; and a venting passageway 66 in communication with the outlet 61 to vent air in the cylinder 40 when the port 62 is closed and adapted to be closed when the valve member 64 is unseated.

In order to adjust the apparatus just described to enable the hopper 10 to receive and then discharge a desired weight of fluent material, the hopper 10 is loaded to that weight and the bolts 57 and 59 are positioned so that the hopper 10 overcomes the force of the spring 55 and tilts sufficiently to exert a force on the element 34 for rocking the lever 48 counterclockwise to effect opening of the pilot valve 42.

In operation with the hopper 10 empty, the valve 16 open and the pilot valve 42 closed, compressed air is caused to enter the pipe 17 by opening a master valve 67 therein whereby the jet pump 14 is put into operation to evacuate the hopper 10. While the hopper 10 is being evacuated, the valve 22 is caused to close and fluent material is then drawn into the hopper 10 from the source 15. When the hopper 10 is loaded with the desired amount of fluent material, the force of the spring 55 is overcome and the hopper 10 tilts downwardly to operate the lever 48 which effects opening of the pilot valve 42. As this occurs, the valve 16 is caused to close and shut off the jet pump 14, whereby the vacuum in the hopper 10 decays, the valve 22 opens and the fluent material is discharged by gravity flow from the hopper 10 to the hopper 11. When the hopper 10 has been unloaded to reduce the weight of the same, the force of the spring 55 reasserts itself whereby the lever 48 is rocked clockwise, the hopper 10 is tilted upwardly, the pilot valve 42 is closed and vents the cylinder 40, and valve 16 reopens to repeat the cycle of operation just described.

Such apparatus is particularly adapted for automatically feeding about one cubic foot of fluent material weighing between about five and seven pounds to the hopper 11 to satisfy its demand for more material from time to time, and thereby takes the place of a laborer who would otherwise be stationed at the hopper 11 to shovel fluent material into the hopper 11.

In the arrangement of foregoing described apparatus, the jet pump 14 is supported at the side of the hopper 11, the opening 24 is at the center of the top of the hopper 10, and the flexible conduit 26 extends radially across the top of the hopper at right angles to the brackets 27 and 28 to minimize any unbalancing effect the conduit 26 may have on the hopper 10.

Figure 6:
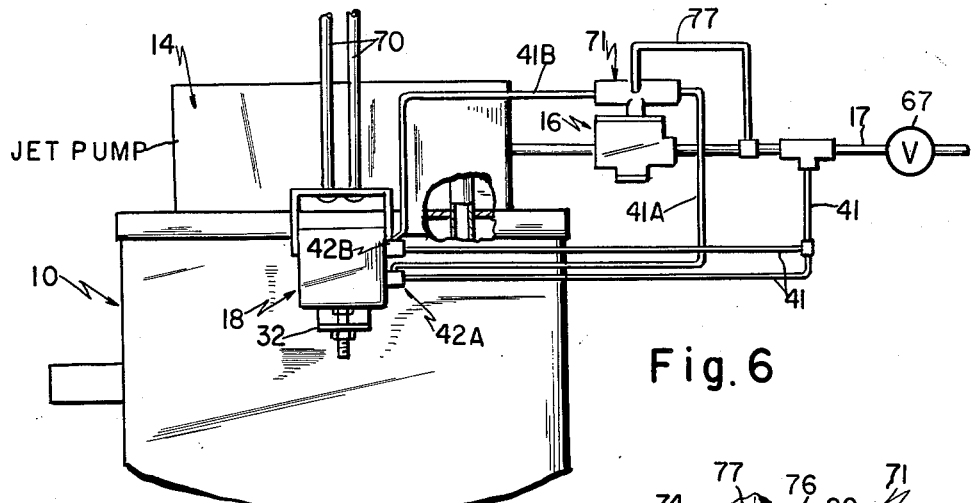
FIG. 6 is a view similar to FIG. 1 illustrating another form of the apparatus in accordance with the present invention.
Figure 7:
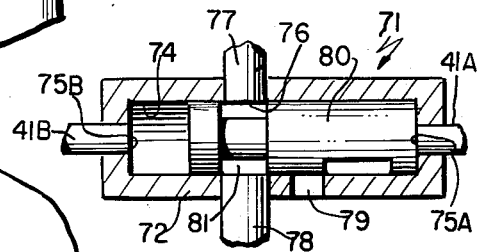
FIG. 7 is an enlarged longitudinal sectional view of a valve which is under the control of the pilot valves of the device shown in FIG. 8 for controlling the valve shown in FIG. 3.
Figure 8:
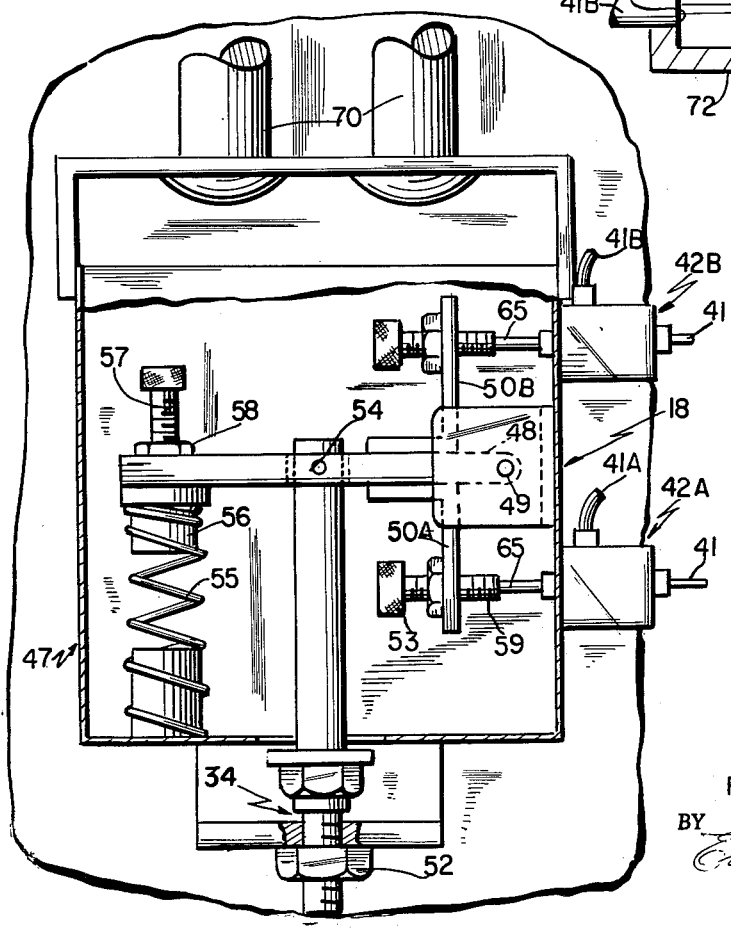
FIG. 8 is a view similar to FIG. 4 illustrating a control device for the apparatus shown in FIG. 6.

Referring now to FIGS. 6 to 8 of the drawings, another form of apparatus is shown which is similar to the apparatus just described except that the hopper 10 is provided with a control device 18 for more accurately weighing batches of fluent material and includes other modifications that could be embodied in the apparatus just described if desired. In these views like reference numerals designate like elements which have been previously described.

Such modifications are that the lug 29 of the hopper 10 and the control device 18 are each supported by a pair of rods 70 suspended from a frame (not shown) and constituting the equivalent of the supporting structure 12; and that the jet pump 14 is mounted on the top of the hopper 10 with its air intake 25 in direct connection with the opening 24 whereby the conduit 26 is eliminated. This latter modification is feasible and desirable where the hopper 10 has a capacity greater than about two cubic feet.

In order to more accurately weigh the batches of fluent material, the valve 16 is controlled so that it closes when the hopper 10 responds to a predetermined increase in weight of fluent material and does not reopen until the hopper 10 responds to an equal decrease in weight of fluent material. Generally, this is accomplished by arranging the lever 48 to actuate two pilot valves 42A and 42B (FIG. 8) at the maximum and minimum loading of the hopper 10, and causing these pilot valves to control a shuttle valve 71 (FIG. 7) which in turn controls the valve 16 to effect opening and closing thereof at the desired instance to thereby start and shut off the jet pump 14.

Such a double control arrangement is particularly advantageous and desirable for feeding fluent materials having a high apparent density such as metallic powders which would cause a considerable variation in the weight of a batch for a small variable in volume even with batches occupying one cubic foot or less. Thus, by causing the controls to respond to a minimum and a maximum weightwise loading of the hopper 10, the weight of the batches is accurately controlled within permissible tolerances, if not exactly in each instance. While such a double control arrangement is primarily adapted for feeding weighed batches, it can also be utilized for replenishing feed hoppers.

As shown in FIG. 6, the inlets 60 of the pilot valves 42A and 42B are both connected to the compressed air pipe 17 by a pipe 41, the outlet 61 of the pilot valve 42A is connected to one side of the shuttle valve 71 by a pipe 41A, and the outlet 61 of the pilot valve 42B is connected to the other side of the shuttle valve 71 by a pipe 41B.

As shown in FIG. 7, the shuttle valve comprises a valve body 72 having a longitudinal bore 74 provided with an inlet 75A at one end for connection of the pipe 41A, an inlet 75B at the other end for connection of the pipe 41B, an inlet 76 at the middle for connection to the air pipe 17 by a pipe 77, an outlet 78 at the middle connected to the inlet of the cylinder 40 of the valve 16 and a venting outlet 79; and a cylindrical shuttle valve member 80 slidably mounted in the bore 74 having a passageway 81 provided with ports for establishing fluid flow communication between the inlet 76 and the outlet 78 to close the valve 16 when the shuttle valve member is at the right and for establishing fluid flow communication between the outlets 78 and 79 to vent the cylinder 40 and cause the valve 16 to open.

The control device 18 shown in FIG. 8 is like that shown in FIG. 4 except that a bracket 85 is secured to the casing 47 for fixed support by the rods 70, two pilot valves 42A and 42B identical to the pilot valve 42 shown in FIG. 5 are employed as already indicated, and the lever 48 has a lower vertical arm 50A for actuating the pilot valve 42A and an upper vertical arm 50B for actuating the pilot valve 42B.

In operation of the apparatus shown in FIGS. 6 to 8, at the start, the hopper 10 is empty and is tilted upwardly by the spring 55 so that the arm 50B opens the pilot valve 42B, and the supply of air to the pipe 17 is shut off by the valve 67. Upon supplying compressed air to the pipe 17 by opening the valve 76, a pulse of air is conducted to the inlet 75B of the valve 71 through the shuttle valve 42B and the pipe 41B to assure that the shuttle valve member 80 is at the left, whereby the valve 16 opens and air is supplied to the jet pump 14 to draw fluent material into the hopper 10.

The hopper 10 responds to the desired weight of fluent material introduced therein and tilts downwardly to rock the lever 48 counterclockwise a sufficient distance to effect closing and venting of the pilot valve 42B (and venting of the inlet 75B) and opening of the pilot valve 42A. As this occurs, the pulse of air is conducted to the inlet 75B of the valve through the pilot valve 42A and the pipe 41A, which causes the shuttle valve member 80 to be moved to the right and supply air to the cylinder 40 for closing the valve 16 and shutting off the jet pump 14, whereby the vacuum in the hopper 10 decays, fluent material ceases to be drawn therein, the valve 22 is caused to open and the fluent material is discharged from the hopper 10 through the outlet 21.

When a predetermined weight of material has been discharged from the hopper, the spring 55 has tilted the hopper 10 upwardly to rock the lever 48 clockwise and effect closing and venting of the pilot valve 42A (and venting of the inlet 75A) and opening of the pilot valve 42B to move the shuttle valve member 80 to the left, whereby the operating cycle of the apparatus is repeated.

In order to accurately adjust the apparatus over a wide range of weights of the batches of fluent material, a set of interchangeable springs 55 of different known values for the range of predetermined weights is supplied with the apparatus, whereby the bolts 57 and 59 need only be used for making further fine adjustment to more accurately weigh the batches.

From the foregoing description, it will be seen that the present invention provides apparatus for intermittently feeding batches of fluent material having a desired weight and/or volume which apparatus is simple, practical and economical in construction and is reliable in operation.

While the apparatus in accordance with the present invention has been described in connection with pneumatic controls which are preferred since they eliminate electrical hazards and dust explosions, it will be understood that a vacuum pump driven by an electric motor could be employed and that electrical switches and solenoids could be substituted for pneumatic valves and pistons in cases where they can be tolerated without creating a hazard. For example, the pilot valves could be switches, the main air control valve could be solenoid operated and the shuttle valve could be a double acting relay.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus for controlling the feeding of fluent material, the combination of a hopper for receiving, storing and discharging fluent material, means for mounting said hopper to tilt in response to the weight of fluent material therein; means for vacuumizing said hopper including a gaseous pressure medium operated jet pump, a pipe for supplying gaseous pressure medium to said pump, a valve in said pipe for controlling the flow of pressure medium therethrough and including a spring for opening said valve and gaseous pressure operated piston means for closing said valve, a normally closed pilot valve connected for controlling the flow of pressure medium to said piston means, a lever pivotally mounted about a fixed point and having a first arm for actuating said pilot valve to open the same and having a second arm provided with means for supporting one side of said hopper, and a spring for opposing the movement of said second arm and adapted to yield in response to the weight of said hopper and its contents to cause said first arm to effect opening of said pilot valve and for moving said second arm to allow said pilot valve to close upon discharge of the fluent material from said hopper.

2. In apparatus according to claim 1, wherein said pilot valve is constructed and arranged for venting its outlet upon closing of said first mentioned valve.

3. In apparatus according to claim 1, wherein said first arm is provided with adjustable means for predetermining the extent of movement thereof required to effect opening and closing of said pilot valve.

4. In apparatus according to claim 1, wherein means are provided for adjusting the force exerted by said last mentioned spring on said second arm.

5. In apparatus according to claim 1, including a second pilot valve connected for controlling the flow of pressure medium to said piston means, a third arm on said lever for actuating said second pilot valve to open the same when said first pilot valve is closed and to allow the same to be closed when said first mentioned pilot valve is opened, and a shuttle valve connected for controlling the flow of pressure medium to said piston means, said first mentioned pilot valve being connected to effect opening of said shuttle valve and said second pilot valve being connected to effect closing of said shuttle valve.

6. In apparatus according to claim 5, wherein said shuttle valve has means for venting said piston means upon closing of said shuttle valve.

7. In apparatus according to claim 6, wherein both of said pilot valves are constructed and arranged for venting their outlets upon closing of said pilot valves.

8. In apparatus according to claim 7, including means for adjusting the force of said last mentioned spring and means for adjusting the extent of movement of said second and third arms required to actuate said first mentioned and said second pilot valves, wherein said first mentioned valve is caused to close when said hopper contains a predetermined weight of fluent material and is caused to open when a predetermined amount of fluent material has been discharged from said hopper.

9. In apparatus for controlling the feeding of fluent material, the combination of a vessel for receiving, storing and discharging fluent material; means for mounting said vessel to tilt in response to the weight of fluent material therein; a pump for delivering fluent material to said vessel including means for supplying energy to said pump to operate the same; means for controlling said energy supply means including a first element for positioning said control means to supply energy to said pump and a second energizable element for positioning said control means to shut off the supply of energy to said pump; pilot means normally positioned to de-energize said energizable element; a lever pivotally mounted about a fixed point and having a first arm for actuating said pilot means to position the same to energize said energizable element and having a second arm provided with means for supporting one side of said vessel; and a spring for opposing the movement of said second arm and adapted to yield in response to the weight of said vessel and its contents to cause said first arm to position said pilot means to energize said energizable element and for moving said second arm to position said pilot means to de-energize said energizable elements upon discharge of the fluent material from said vessel.

10. In apparatus according to claim 9, including second pilot means for controlling said energizable element, a third arm on said lever for actuating said second pilot means to render the same effective when said first mentioned pilot means is ineffective and vice versa, and means for controlling the energization of said energizable element, said first mentioned pilot means being connected to render said last mentioned means effective and said second pilot means being connected to render said last mentioned means ineffective.

References Cited by the Examiner
UNITED STATES PATENTS

| | | | |
|---|---|---|---|
| 1,937,158 | 11/33 | Lorentz | 302—17 |
| 2,032,367 | 3/36 | Kennedy | 302—53 |
| 2,514,333 | 7/50 | Mylting | 302—17 |
| 2,992,858 | 7/61 | Pendleton | 302—17 |

SAMUEL F. COLEMAN, *Primary Examiner.*
ANDRES H. NIELSEN, *Examiner.*